Sept. 15, 1936.  H. W. JONES ET AL  2,054,425
CUTTING OR WELDING MACHINE
Filed March 31, 1934   3 Sheets-Sheet 3
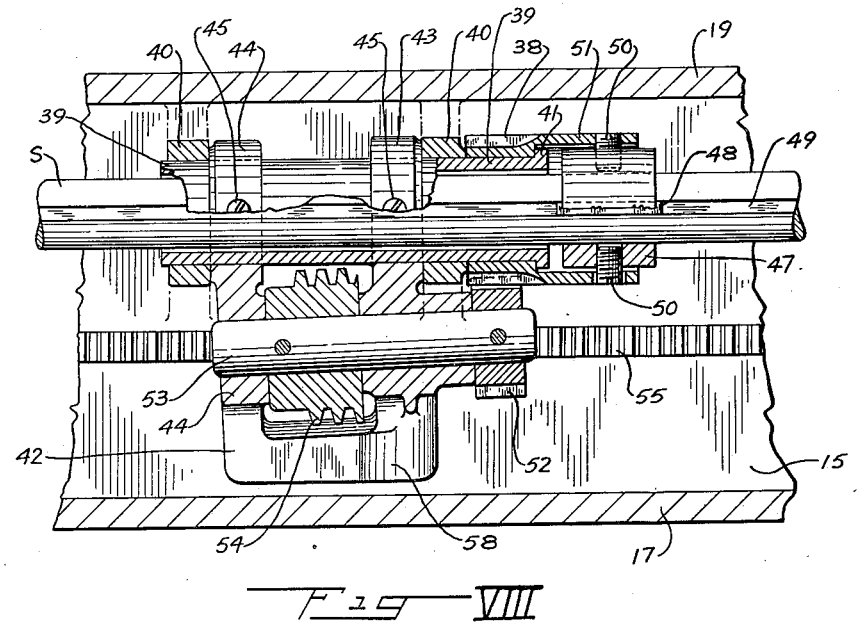
Fig. VIII
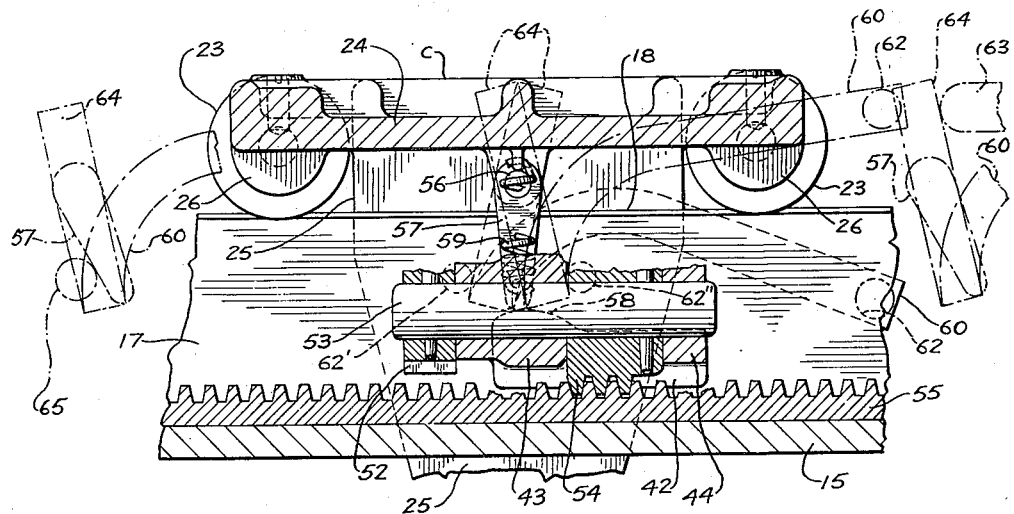
Fig. IX
INVENTORS
HOMER W. JONES
JAMES H. BUCKNAM
HERBERT W. COWIN
BY
ATTORNEY Patented Sept. 15, 1936

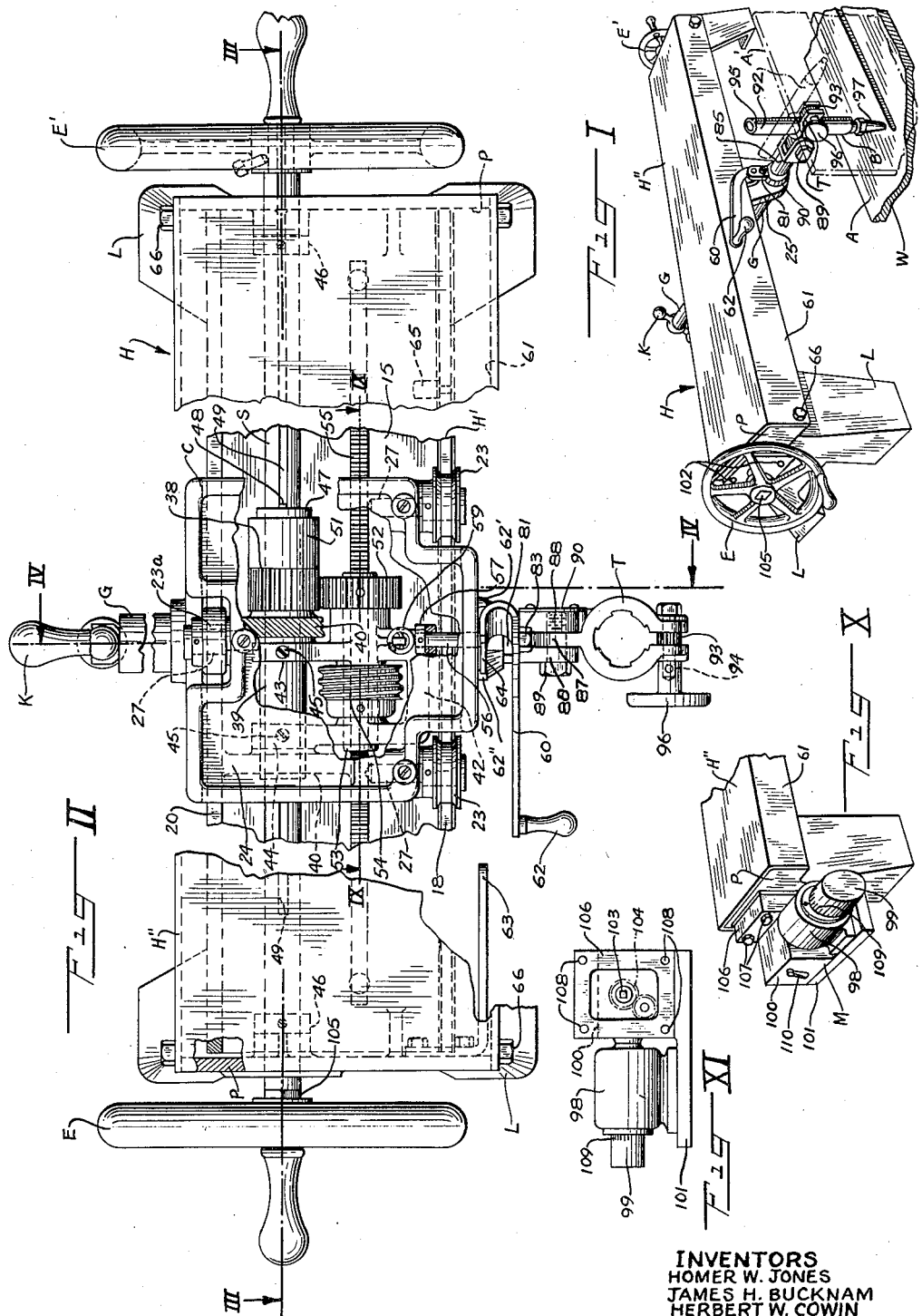

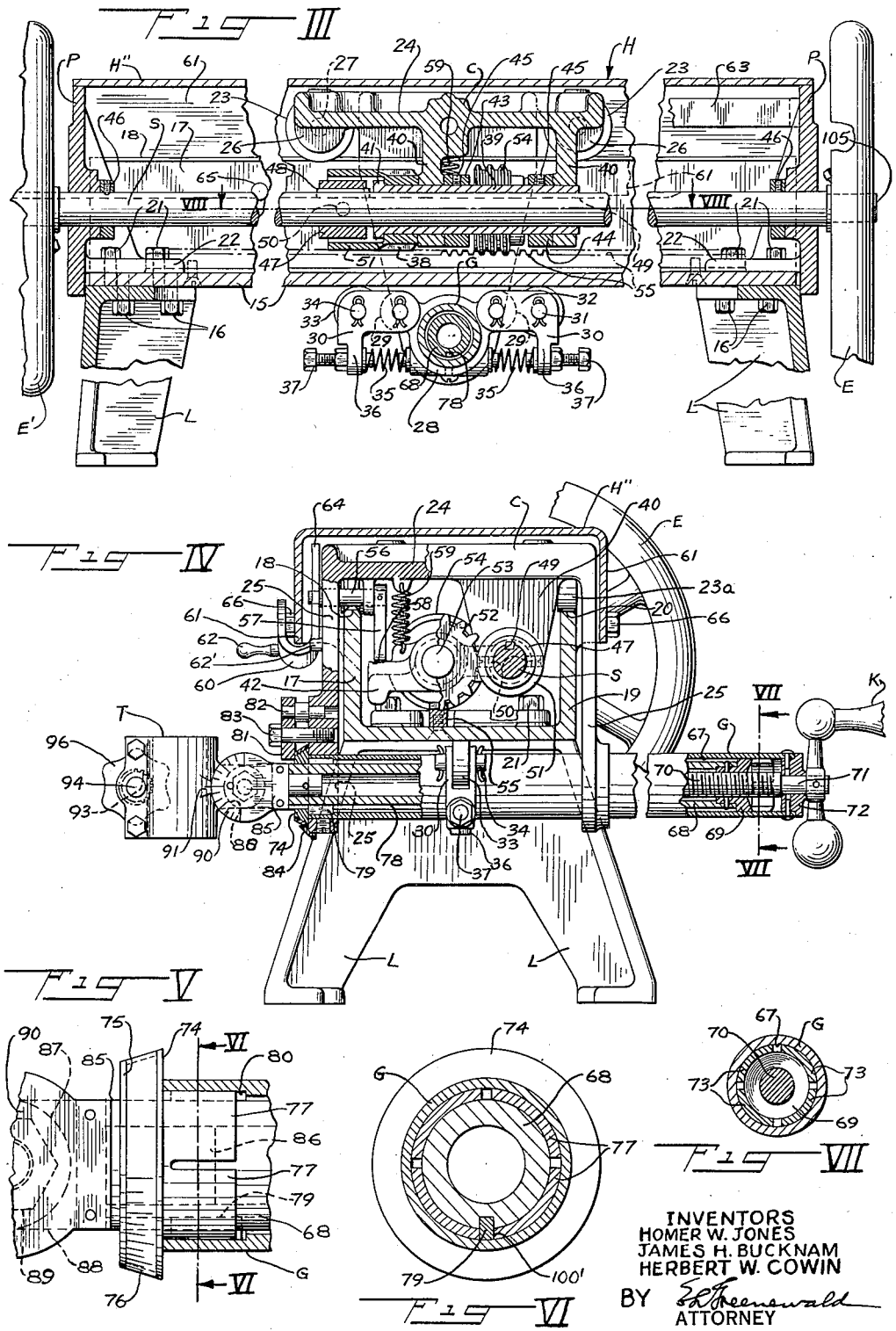

2,054,425

UNITED STATES PATENT OFFICE 2,054,425

CUTTING OR WELDING MACHINE

Homer W. Jones, Elizabeth, James H. Bucknam, Cranford, and Herbert W. Cowin, Westfield, N. J., assignors, by mesne assignments, to Union Carbide and Carbon Corporation, a corporation of New York Application March 31, 1934, Serial No. 718,524

29 Claims. (Cl. 266—23)

This invention relates to an improved machine for cutting or welding metals or the like.

Among the objects of this invention are: the provision of an improved machine having a longitudinal and a cross feed mechanism adapted to carry a holder for a tool, such as a blowpipe or like tool, both of the mechanisms being adapted to move the tool holder with precision and without chatter, the tool holder also being adapted to be moved rapidly lengthwise of the machine independently of the precision mechanism; to increase the manufacturing tolerance of the parts in such a machine without detrimentally affecting the performance of the machine; the provision of an improved cutting and welding machine having a low center of gravity to provide stability and reduce vibration; the provision of a universal pivotal movement for the tool holder so that the blowpipe may be adjusted for cutting squared or beveled cuts in plates arranged either horizontally or inclined in respect to the base of the machine; the provision of an improved machine having substantially all of its driving mechanism protected from dirt and other objects and having no parts adapted to move outwardly from the machine when it is in operation except the tool holder when it is operated by the cross feed mechanism; and the provision of a power attachment for operating the longitudinal feed mechanism and a means for manually operating said mechanism independently of the power attachment.

The above and other objects and novel features of this invention will be understood from the following description and accompanying drawings, in which:

Fig. I is a perspective exterior view of a machine illustrating an embodiment of the invention;

Fig. II is a top plan view of the machine shown in Fig. I, but having a portion of the top cover plate broken away and portions of the machine shown in horizontal cross-section;

Fig. III is a vertical cross-sectional view shown on line III—III in Fig. II;

Fig. IV is an irregular section on line IV—IV in Fig. II;

Fig. V is an enlarged view of the tool arm adjusting collar, assembled in a fragmentary longitudinal cross-section of the tool arm guide;

Fig. VI is a cross-sectional view on line VI—VI in Fig. V;

Fig. VII is a cross-sectional view on line VII—VII in Fig. IV;

Fig. VIII is a cross-sectional view of a portion of the machine on line VIII—VIII in Fig. III;

Fig. IX is a cross-sectional view of a portion of the machine on line IX—IX in Fig. II, the operation of the carriage stop mechanism being illustrated in dot and dash lines;

Fig. X is an isometric view of one end of the machine shown in Fig. I in which a power attachment is secured thereto and substituted for the handwheel on that end; and Fig. XI is a view of the side of the motor base plate adapted to be secured to the end plate of the machine.

As shown, a machine embodying this invention comprises a carriage C which supports a tool, such as a blowpipe B, and is propelled by a rotating shaft S in either direction longitudinally of a track located adjacent the work. The carriage C, the drive shaft S, and the mechanism by which the carriage is propelled are mounted on and enclosed by a housing H which comprises a channel H' closed by end plates P and a removable top cover H''. The upper edges of the sides of the channel H' provide the track for supporting and guiding the carriage C. The blowpipe B is carried by and is adjustable along a guide tube G which is secured to the carriage C and extends under and transversely of the channel H', which latter is elevated from the floor by legs L. The shaft S is rotatively mounted in the end plates P. It extends longitudinally through the channel H' and may be rotated by handwheels E, E' respectively secured to the opposite ends of the shaft, or an electric motor driven mechanism M shown in Figs. X and XI, may be substituted for one of these handwheels. Upon turning a cross-feed handle K, the blowpipe B may be fed along the guide tube G below the housing H, either while the longitudinal feed is operating or idle, thereby enabling the blowpipe to be propelled in any direction in a horizontal plane to make a desired cut, to weld along a predetermined line, or for other purposes. The blowpipe B is mounted in a tool holder T having a universal pivotal movement, thereby enabling the blowpipe B to cut bevels and to cut metals having their surfaces either parallel to the plane of the base of the machine or perpendicular or inclined thereto.

Referring to Figs. II and III, the base 15 of the channel H' is supported at each end on the legs L and is secured thereto by cap screws 16. The top edge of the front side 17 of the channel H' is formed with a ridged or beveled surface to provide a supporting and guide rail 18 of the track for the carriage C. The top edge of the rear side 19 of the channel H' is flat and provides the other rail 20 of the track for the carriage C. The end plates P are secured in the channel H' by cap screws 21 which pass through a foot 22 on each of the end plates and are screwed into the base 15 of the channel H'.

The carriage C is adapted to travel between the end plates P of the channel H' and is supported by wheels 23 and 23a which travel along the rails 18 and 20 respectively of the channel H'. The frame of the carriage comprises a top plate 24 and depending legs 25 which extend downwardly over the outside of the channel H' and support the guide tube G in the lower ends. The top plate 24 of the carriage C is provided with bosses 26 which are bored to receive stub shafts 27 upon which the carriage wheels 23 and 23a are journaled. Preferably the carriage is supported upon three wheels as shown. Two of the wheels 23 are grooved and travel upon the front rail 18 to support one side of the carriage and to guide the carriage upon the track. The third wheel 23a travels upon the rear flat rail 20 and acts as a support for the other side of the carriage. This construction provides a three-point support for the carriage and permits the grooved wheels 23 and the ridged rail 18 to guide the carriage C independently of the other wheel and rail and thereby permits greater tolerance in the alignment of the rails.

A mechanism is carried by the guide tube G beneath the channel H' for holding the carriage wheels 23 and 23a on the rails 18 and 20 in the event the carriage C should be tipped by the extension of the blowpipe transversely of the machine or other unbalancing causes. For this purpose, as shown in Figs. III and IV, a block 28 having a bore therethrough receives the guide tube G and is secured thereto; lugs 29 are formed on each side of the block 28, to each of which a bell crank lever 30 is pivoted on bearing pins 31 which extend through the crank arms 32 and the lugs 29; and rollers 33 are journaled between bifurcated portions of the lever arms 32 on bearing pins 34 secured in the levers 30. A spring 35 is compressed between the block 28 on the guide tube G and the lower arm 36 of the bell crank lever 30. A set screw 37 is provided in the lower arm 36 of each bell crank lever 30 to adjust the compression of spring 35 and to control the force applied to the rollers 33 against the base plate 15 of the channel H'. When the carriage C is moved along the longitudinal rails 18 and 20 the rollers 33 on the bell crank levers 30 are forced against the base 15 of the channel H' by the springs 35 and yieldably retain the upper carriage rollers 23 and 23a on the rails. The yieldable action exerted between the rollers 33 and carriage wheels 23 on the channel H' by the springs 35 also reduces the vibration of the carriage as it travels along the longitudinal track.

As shown in Figs. II, III, and VIII, the carriage C may be driven with precision along the longitudinal track by the longitudinal feed mechanism comprising a spur gear 38 driven by the shaft S and mounted on a hollow bushing 39 oscillatably mounted in coaxial bearings in the lower end of a pair of legs 40 which extend downwardly from the top plate 24 of the carriage and between the sides 17 and 19 of the channel H'. A head 41 is formed on the hollow bushing 39 to retain the spur gear 38 thereon.

A swinging bracket 42 is also supported on and adapted to oscillate with the bushing 39. In assembling the gear 38 and the bracket 42 on the bushing 39, the end of the bushing opposite the head 41 is passed through the gear 38, the bearing in one of the legs 40, a bore in an arm 43 on the swinging bracket 42 bearing against the inside of one leg 40, and a bore in an arm 44 on the bracket bearing against the inside of the other leg 40, and finally through the bearing of the other leg 40. Set screws 45 extend into threaded bores in each of the bracket arms 43 and 44 and are screwed down against the bushing 39. Since the swinging bracket arms 43 and 44 bear against the inside of the legs 40 the assembly is retained in place by the set screws 45.

The drive shaft S extends through the hollow bushing 39 and is rotatably mounted in bearings in the channel end plates P and it is held against longitudinal displacement by collars 46 fixed thereon. In order to permit considerable tolerance in the axial alignment of the bushing 39 and the drive shaft S, the diameter of the bore in the bushing 39 is made considerably larger than the diameter of the shaft S, as shown in Fig. VIII, and the shaft S is flexibly connected to the spur gear 38 through a sleeve 47. The sleeve 47 is slidably keyed to the drive shaft S by a key 48 secured in the sleeve and slidably fitted in a longitudinal keyway 49 in the shaft S. The spur gear 38, journaled on the hollow bushing 39 is driven from the drive shaft S by oppositely disposed screws 50 which extend through oversize bores in an overhanging rim 51 on the spur gear 38 and into a threaded bore in the sleeve 47. The heads of the screws 50 contact with the rim 51 on the spur gear 38 and flexibly couple the sleeve 47 and drive shaft S to the spur gear 38.

The spur gear 38 meshes with a spur gear 52 secured to one end of a short shaft 53 which is journaled in the outer end of the arms 43 and 44 of the swinging bracket 42. A worm 54 positioned between the arms 43 and 44 of the swinging bracket 42 is secured to the short shaft 53. The teeth on the worm 54 are adapted to mesh with the teeth on a rack 55 which is secured to the channel base 15 and through this driving connection the carriage C may be driven along the rails 18, 20.

In order that the line of thrust between the teeth on the rack 55 and the teeth on the worm 54 may be parallel with the direction of travel of the carriage, the teeth on the rack 55 are cut perpendicular to the length of the rack and the direction of travel of the carriage C and the short shaft 53 upon which the worm 54 is mounted, is inclined to the length of the rack 55 at an angle equal to the angle of the helix of the teeth or thread on the worm 54 so that the horizontal thrust of the teeth on the worm against the teeth on the rack will be in the direction of travel of the carriage C. Since the thrust between the worm 54 and the rack 55 is parallel to the carriage travel, there are substantially no forces tending to push the carriage C sideways, and friction and vibration and the tendency of the worm teeth to climb out of engagement with rack teeth is reduced.

In constructing the longitudinal drive mechanism of this machine just described provision has been made to allow the ridged rail 18 and grooved carriage wheels 23 cooperating therewith to have complete freedom of action in guiding the carriage C in a longitudinal direction. Also provision has been made for facilitating the manufacture of the machine by allowing a great degree of tolerance in the parallel alignment of the flat rail 20, the hollow bushing 39, and the longitudinal drive shaft S with the guiding rail 18 and with each other, without interfering with the guiding action of the rail 18 and grooved wheels 23 in guiding the carriage C, and without causing the hollow bushing 39 to bind upon the shaft S as it slides over the shaft. With the employment of this principle the blowpipe B may be guided in a straight line with as great precision as the rail 18 can be formed.

As particularly shown in Figs. II, IV, and IX mechanism is provided for swinging the bracket 42 in an arc about the axis of the hollow bushing 39 in order to engage and disengage the worm 54 and the rack 55 and thereby start or stop the longitudinal travel of the carriage C when it is being driven from the shaft S. This mechanism comprises a short shaft 56 mounted in the front carriage leg 25. The shaft 56 extends inwardly over the top of the front rail 18 of the channel H' and has a cam 57 secured to its inner end. The cam 57 extends downwardly into the channel H' and engages a cam surface 58 on the swinging bracket 42. A tension spring 59 is fixed to the swinging bracket 42 and to the top plate 24 of the carriage frame for the purpose of moving the bracket 42 upward and maintaining the cam surface 58 in contact with the cam 57. The cam 57 may be operated in opposition to the spring 59 by a manually operable crank 60 fixed to the cam shaft 56 to engage or disengage the worm 54 and the rack 55. As shown in Figs. II and IV the cam shaft crank 60 is U shaped and extends downwardly from the cam shaft 56 along the outside of the front leg 25 of the carriage frame to a point where the downwardly depending flange 61 of the top cover H'' terminates, and is bent upwardly on the outside of the top cover flange 61. A handle 62 is fixed to the crank 60 and may be moved in an arc about the axis of the cam shaft 56 to operate the cam 57. A lug 62' is secured to the front carriage leg 25 and is adapted to engage the crank 60 when the cam 57 is moved into position for the engagement of the worm 54 with the rack 55 and thereby limit the movement of the cam and retain it in this position. A similar lug 62'' is secured to the carriage leg 25 on the opposite side of the crank 60 and is adapted to engage the crank for the purpose of limiting the movement of the cam 57 when the cam is moved in the opposite direction into the position in which the worm 54 is disengaged from the rack 55.

In order to prevent the carriage from striking against the end plates P at the end of its travel, means are provided at each end of the machine to automatically operate the cam 57 and permit the spring 59 to throw the worm 54 out of engagement with the rack 55. As shown in Figs. II and IX, the stop mechanism comprises a stop 63 fixed to the left end plate P as viewed in Fig. II or from the front of the machine. The stop 63 is adapted to engage an upwardly extending projection 64 on the cam shaft crank 60 and thereby disengage the worm 54 from the rack 55. Another stop 65 is secured to the side 17 of the channel H' at the right end of the channel as viewed in Fig. II and is adapted to engage the cam 57 to release the worm 54 from the rack 55.

The operation of the foregoing worm shifting mechanism is illustrated in Fig. IX. The full and dotted lines indicate the position of the mechanism after the crank 60 has been moved downward to engage the worm 54 with the rack 55 and the dot and dash lines indicate the position of the mechanism when the worm 54 is disengaged from the rack 55 when the mechanism is operated manually by the crank 60 or automatically by the stops 63 and 65 at either end of the machine. When the crank handle 62 is brought downward the end of the cam 57 rides along the cam surface 58 until the crest of the cam surface is reached and the lower end of the crank 60 strikes the limiting lug 62'. The cam surface 58 moves downward under the cam 57 and engages the worm 54 with the rack 55. When the crank handle 62 is moved upwardly to the dot and dash position the lower end of the crank 60 strikes the limiting lug 62'' and the cam 57 is moved to the right as viewed in Fig. IX and permits the spring 59 to pull the cam surface 58 upward and disengage the worm 54 from the rack 55.

As shown at the right in Fig. IX in dot and dash lines the upwardly extending projection 64 of the crank 60 strikes the stop 63 as the carriage C reaches that end of the machine and shifts the cam 57 to the worm-released position, and as shown at the left the lower end of the cam 57 strikes the stop 65 as the carriage C reaches that end of the machine and shifts the cam 57 to the worm-released position.

The longitudinal driving and worm shifting mechanism is protected by the top cover H'' as the carriage C travels along the rails 18 and 20 on the channel H'. The top cover H'' is provided with downwardly extending flanges 61 which are secured to the end plates P by cap screws 66 and are spaced from the sides of the channel H' to provide a space for the carriage legs 25 to operate within.

The cross feed mechanism of the machine is mounted in the guide tube G which is slung underneath the channel H'. As shown in Fig. IV, the guide tube G is provided with a smooth bore 67 within which a tool arm 68 is adapted to slide. Clearance is provided between the walls of the bore 67 in the guide tube G and the tool arm 68. The inner end of the tool arm 68 is supported within the bore 67 by a lead screw nut 69 secured to the end of the tool arm 68. A cross feed lead screw 70 engages the screw threads in the lead screw nut 69 and extends therethrough into the hollow tool arm 68. The outer end of the lead screw 70 has a trunnion 71 which is journaled in a thrust collar 72 secured to the hollow guide tube G. The cross feed crank handle K is secured to the end of the lead screw trunnion 71, and may be turned to move the arm 68 transversely of the longitudinal movement of the carriage C.

As shown in detail in Fig. VII, the outer end of the lead screw nut 69 is shaped into a cylindrical spring head which is divided into a plurality of segments or spring leaves 73 which are sprung outwardly to slidably and resiliently engage the inner walls of the guide bore 67, and thereby reduce the vibration of the inner end of the tool arm 68. The outer end of the tool arm 68 is supported in the arm guide bore 67 by means of a cylindrical spring collar 74 having a head 75 and a protractor scale 76 thereon and segmental spring leaves 77 as shown in detail in Figs. V and VI. The segmental spring leaves 77 are sprung inwardly so as to form resilient slidable contact with the outer cylindrical surface of the tool arm 68 as the arm slides through the collar 74 and thereby prevents the arm 68 from vibrating within the guide G.

A longitudinal keyway 78 is cut in the arm 68 and a key 79 is slidably fitted within the keyway. As shown in detail in Fig. VI, a slot 100', wider than the spacings between the spring leaves 77, is cut in the spring collar 74 between two of the spring leaves 77 to receive the portion of the key 79 which projects beyond the cylindrical wall of the tool arm 68 and definitely fixes the radial position of the collar in reference to the tool arm 68. A counterbore 80 is formed in the forward end of the guide tube G to receive the spring leaves 77 of the collar 74. When the spring collar 74 and the key 79 are assembled on the tool arm 68 and in the counterbore 80 of the guide tube G, the collar 74 is keyed against rotation on the tool arm but is adapted to rotate therewith within the counterbore 80.

As shown in Fig. IV, the tool arm 68 may be held by a clamping bar 81 in any position it may be rotated. The bar 81 is pivoted on a pin 82 secured to the front leg 25 of the carriage C. A cap screw 83 extends through a bore in the clamping bar 81 and its end is screwed into a threaded bore in the front leg 25 of the carriage C. The head of the cap screw 83 is adapted to be screwed down against the clamping bar 81 and clamp the head 75 of the spring collar 74 between the bar 81 and the leg 25 of the carriage C. A pointer 84 is provided on the leg 25 of the carriage C adjacent to the protractor scale 76 to indicate the angular position of the arm 68.

The tool holder arm 68 comprises an extension 85 having a shank 86 secured in the hollow bore of the tool holder arm 68. As shown in Figs. II and IV, and as illustrated in dot and dash lines in Fig. I, the tool holder T is pivoted on the extension 85 so that the blowpipe B can be turned either parallel to or at an angle to the axis of the tool holder arm 68. The pivotal joint comprises a lug 87 on the holder T pivotally secured between two ears 88 on the extension 85 of the tool arm 68 by a cap screw 89 which passes through one of the ears 88 and through the lug 87 and into a threaded bore in the other ear. The screw 89 maintains sufficient friction between the engaging joint parts to retain the tool holder T in any angular position about the axis of the screw it may be set. A protractor scale 90 is attached to one of the ears 88 and the angular position of the axis of the holder T in reference to the axis of the holder arm 68 is indicated by the reading on the scale opposite an indicator 91 on the holder T.

The tool holder T may be provided with a bore through which a blowpipe body 92 is adapted to slide. Mechanism of the usual construction is provided for adjusting the blowpipe body 92 longitudinally within the holder T. This mechanism comprises a pinion 93 mounted on a shaft 94 journaled in the blowpipe holder T. The pinion 93 meshes with a rack 95 on the body 92 of the blowpipe B and may be operated by a hand wheel 96 to slide the blowpipe B within the holder T.

The blowpipe B is provided with a nozzle 97 which is adapted to discharge heating and/or cutting gas streams in line with the longitudinal axis of the holder T and the blowpipe B. The several angular adjustments of the blowpipe holder T provide a means for directing the gas streams at any desired angle or direction upon the surface of metal, or the like, to be operated upon.

In order that the longitudinal feed mechanism may be driven by power, the motor mechanism M, shown in Figs. X and XI, is adapted to be interchanged with the left handwheel E shown in Fig. I. When the motor mechanism is connected to the drive shaft S the latter may be driven by the motor 98 or the handwheel E' on the other end of the machine. The motor mechanism M comprising a reversible variable speed electric motor 98 having a changeable speed governor 99 and a gear and clutch mechanism enclosed in a gear box 100 is mounted on an angle base plate 101. It will be understood however, that a non-reversible motor or a reversing gear mechanism may be used to drive the carriage in either longitudinal direction. As shown in Fig. I the channel end plate P on the left is provided with a number of threaded bores 102. When the handwheel E is removed the square socket 103 of the motor driven gear 104 may be fitted over the square end 105 of the shaft S. The vertical leg 106 of the motor base plate 101 may be attached to the end plate P of the channel H' by cap screws 107 which extend through bores 108 in the motor base plate 101 and into the threaded bores 102 in the end plate P. The motor mechanism M so attached to the machine is adapted to drive the longitudinal drive shaft S at a number of constant speeds, since the governor 99 may be set in accordance with a speed-indicating scale 109 to maintain a predetermined constant motor speed. Preferably the governor scale 109 is graduated in the rate of linear longitudinal travel of the tool holder T so that the blowpipe B carried thereby will be started and carried at a constant predetermined speed. A clutch (not shown) in the gear box 100 may be operated by a handle 110 to engage or disengage the motor 98 from the drive shaft S so that the shaft S may be operated by the motor 98 or the opposite handwheel E'.

As illustrated in full lines in Fig. I, the machine may operate upon metal work W having a surface A arranged in a plane parallel to the plane of the base of the machine or as shown in dotted lines the machine may operate upon metal work W having a surface A' arranged in a plane at an angle to the horizontal base of the machine. When a tool such as a blowpipe B is used in the tool holder T the desired angle of incidence of the gas stream or streams discharged from the blowpipe nozzle 97 upon the surfaces of the work W may be obtained by turning the holder T about the axis of the cap screw 89 and about the axis of the blowpipe arm 68, and setting the angle in accordance with the protractor scales 76 and 90 respectively. The end of the nozzle 97 may be properly spaced from the surface of the work W by operating the handwheel 96 on the tool holder T.

Assuming that the worm 54 is disengaged from the rack 55 the operator may grasp the tool holder T and push the carriage C along the track rails 18 and 20 until the nozzle 97 of the blowpipe B is substantially on or transversely opposite the starting point of the cut or weld. The worm shift handle 62 is operated to engage the worm 54 with the rack 55 and nozzle 97 may be directed with precision upon the starting point by operating the hand wheels E or E' and the cross feed handle K. The cut or weld may be made with the use of the longitudinal feed mechanism and the cross feed mechanism, with or without the use of the motor device mechanism as will be understood from the previous description.

While one embodiment of this invention has been shown and described it will be understood that changes in the details as disclosed herein may be made without departing from the scope of the invention as described in the appended claims.

We claim:

1. In a machine for propelling a tool such as a blowpipe, the combination of a channel; a carriage movable along the upper side of said channel; means within said channel for propelling said carriage and means secured to said carriage and extending across and beneath said channel for supporting said tool or blowpipe.

2. In a machine for propelling a tool such as a blowpipe, the combination of a channel having spaced substantially parallel sides and a base, the top edges of said sides constituting rails; a carriage engaging and movable along said rails, said carriage having legs extending below said base; mechanism between said channel sides for propelling said carriage; and means secured to said carriage legs for supporting said tool or blowpipe.

3. In a machine for propelling a tool such as a blowpipe, the combination of a channel having substantially parallel sides and a base, the top edges of said sides constituting a pair of track rails; a carriage movable along said rails; a support secured to said carriage and extending across and beneath said channel for supporting said tool or blowpipe; and means secured to said support and adapted to travel along said channel base to retain said carriage on said rails.

4. In a machine for propelling a tool such as a blowpipe, the combination of a channel having substantially parallel sides and a base, the top edges of said sides constituting a pair of track rails; a carriage movable along said track rails; a support secured to said carriage and extending across and beneath said channel for supporting said tool or blowpipe; and means secured to said support and resiliently pressed against said channel base.

5. In a machine for propelling a tool such as a blowpipe, the combination of a channel having substantially parallel sides and a base, the top edges of said sides constituting a pair of track rails; a carriage movable along said track rails; a support secured to said carriage and extending across and beneath said channel for supporting said tool or blowpipe; rollers secured to said support and adapted to travel along said channel base; and means for resiliently holding said rollers against said base.

6. In a machine for propelling a tool such as a blowpipe, the combination of a channel having substantially parallel sides and a base, the top edges of said sides constituting a pair of track rails; a carriage movable along said track rails; said carriage comprising a pair of depending legs extending on the outside of said channel sides; a support secured to the lower ends of said legs and extending across and beneath said channel for supporting said tool or blowpipe; and means secured to said support and resiliently pressed against said channel base.

7. In a machine for propelling a tool such as a blowpipe, the combination of a channel having substantially parallel sides and a base, the top edges of said channel sides, one of said rails acting alone as a guide rail constituting a pair of track rails; a carriage movable along the upper side of said track rails, said carriage comprising a pair of depending legs extending on the outside of said channel sides; a support secured to the lower end of said legs and extending across and beneath said channel for supporting said tool or blowpipe; and means secured to said support and resiliently pressed against said channel base to retain said carriage upon said rails.

8. In a machine for propelling a tool such as a blowpipe, the combination of a track; a carriage mounted on said track and adapted to carry said blowpipe; means for driving said carriage along said track comprising a stationary member; a shaft extending lengthwise of said track; a gear rotatably mounted in said carriage and slidably keyed to said shaft; and a driving connection between said gear and said stationary member.

9. In a machine for propelling a tool such as a blowpipe, the combination of a carriage adapted to carry said tool; means for propelling said carriage comprising a worm carried by said carriage; a stationary rack engageable by said worm; a drive shaft for rotating said worm; and means operable to mesh said worm with said rack to propel said carriage when said shaft is rotated.

10. In a machine for propelling a tool such as a blowpipe, the combination of a track; a carriage mounted on said track and adapted to carry said blowpipe; means for driving said carriage along said track comprising a shaft extending lengthwise of said track; a stationary rack extending lengthwise of said track; a worm mounted in said carriage and driven by said shaft; manual means for shifting said worm into engagement with said rack; and means for automatically disengaging said worm from said rack at each end of said track.

11. In a machine for propelling a tool such as a blowpipe, the combination of a track; a carriage mounted on said track, and adapted to carry said blowpipe; means for driving said carriage along said track comprising a shaft extending lengthwise of said track; a gear rotatably mounted in said carriage and slidably keyed to said shaft; a worm driven by said gear and oscillatable about said shaft; a stationary rack engageable by said worm; and means operable to engage and disengage said worm and rack.

12. In a machine for propelling a tool such as a blowpipe, the combination of a track; a carriage mounted on said track and adapted to carry said blowpipe; means for driving said carriage along said track comprising a stationary member; a shaft extending lengthwise of said track; a journal on said carriage, said journal having a longitudinal bore through which said shaft extends without nominally contacting therewith; a gear rotatably mounted on said journal; a sleeve slidably keyed to said shaft and flexibly connected to said gear; and a driving connection between said gear and said stationary member for propelling said carriage.

13. In a machine for propelling a tool such as a blowpipe, the combination of a track; a carriage mounted on said track and adapted to carry said blowpipe; means for driving said carriage along said track comprising a stationary rack; a shaft extending lengthwise of said track; a journal on said carriage, said journal having a longitudinal bore through which said shaft extends without nominally contacting therewith; a gear slidably mounted on said journal; a sleeve slidably connected to said shaft and flexibly connected to said gear; and a driving connection between said gear and said rack for propelling said carriage.

14. In a machine for propelling a tool such as a blowpipe, the combination of a track; a carriage mounted on said track and adapted to carry said blowpipe; means for driving said carriage along said track comprising a shaft extending lengthwise of said track; a bushing carried by said carriage; said bushing having a bore loosely fitted about said shaft; a gear journaled on said bushing; a sleeve slidably keyed to said shaft and flexibly connected to said gear; a bracket mounted on and having an end oscillatable about said bushing; a worm mounted on said oscillatable end and driven by said gear; a stationary rack engageable by said worm; and means operable to engage and disengage said worm and rack.

15. In a machine for propelling a tool, such as a blowpipe, the combination of a track; a carriage mounted on said track and adapted to carry said blowpipe; and means for driving said carriage along said track; said means comprising a shaft extending lengthwise of said track; a stationary rack extending lengthwise of said track, said rack having teeth thereon cut at right angles to the lengthwise direction of said track; and a worm rotatably mounted on said carriage and having a helical thread adapted to mesh with said rack teeth, the axis of said worm being inclined to the direction of said track at an angle substantially equal to the helix angle of said helical thread.

16. In a machine for propelling a tool such as a blowpipe, the combination of a channel comprising parallel sides; a carriage adapted to carry said tool and supported upon and guided by said sides; a drive shaft extended through said channel lengthwise of said sides; and mechanism within said channel whereby said carriage is propelled by said shaft, said mechanism comprising a plurality of gears driven by said shaft.

17. In a machine for propelling a tool such as a blowpipe, the combination of a carriage adapted to carry said tool; mechanism for propelling said carriage, and a housing substantially enclosing said carriage and said mechanism, said mechanism being adapted to propel said carriage relatively to said housing.

18. In a machine for propelling a tool such as a blowpipe, the combination of a housing comprising a channel and a removable cover therefor; a tool-supporting carriage substantially enclosed by said housing and movable lengthwise thereof; a shaft extending lengthwise through said channel; and mechanism within said housing whereby said carriage is propelled by said shaft.

19. In a machine for propelling a tool such as a blowpipe, the combination of a track; a carriage mounted on said track; said carriage having legs extending downwardly on the side of said track; a guide tube suspended underneath said track in the lower ends of said legs; a tool arm slidable within said tube; and means cooperating with said arm and said tube for operating said arm in said tube transversely with respect to said track.

20. In a machine for propelling a tool such as a blowpipe, the combination of a track; a carriage mounted on said track; said carriage having a pair of legs extending downwardly on the side of said track; a guide tube suspended underneath said track in the lower ends of said legs; a tool arm slidable within said tube; a tool holder on the end of said arm; means for pivoting said holder in two planes substantially perpendicular to each other; and means cooperating with said arm and said tube for operating said arm transversely with respect to said track.

21. In a machine for propelling a tool such as a blowpipe, a tool-operating mechanism comprising a guide tube; a tool arm slidable within said tube; and spaced resilient bearings within said tube adapted to slidably support said arm within said tube.

22. In a machine for propelling a tool such as a blowpipe, a tool-operating mechanism comprising a guide tube; an arm slidable within said tube and having a tool holder attached to the outer end thereof; means for sliding said arm within said tube; means for turning said arm within said tube; and means for setting said arm in the position it may be turned.

23. In a machine for propelling a tool such as a blowpipe, a tool-operating mechanism comprising a guide tube; an arm slidable within said tube and having a tool holder attached to the outer end thereof; means for sliding said arm within said tube; spaced resilient bearings within said tube adapted to slidably support said arm in said tube; means for turning said arm within said tube; and means for setting said arm in the position it may be turned.

24. In a machine for propelling a tool such as a blowpipe, a tool-operating mechanism comprising a guide tube; a hollow tool arm having one end slidable within said tube and having a tool holder attached to the other end of said arm and extending outside of said tube; a lead screw nut secured to the end of said arm within said tube; said nut having a resilient friction bearing secured thereto and adapted to expand against the bore of said tube and slidably support the end of said arm within said tube; a resilient friction bearing surrounding said arm and secured in the end of said tube through which said arm projects; means for fixing said arm against rotation within said tube; and a lead screw cooperating with said lead screw nut and adapted to move said arm longitudinally in said tube.

25. In a machine for propelling a tool such as a blowpipe, a tool-operating mechanism comprising a guide tube; a hollow arm having one end slidable within said tube and having a tool holder attached to the other end of said arm extending outside of said tube; a lead screw nut secured to the end of said arm within said tube; said nut having a resilient friction head expanded on all sides against the bore of said tube and adapted to firmly support said arm within said tube; a resilient friction bearing collar surrounding said arm and extending into the end of said tube through which said arm projects; said arm having a longitudinal keyway extending longitudinally thereof; a key slidably fitted in said groove; means for rotating said key and arm; means for holding said arm in the position it may be rotated; and a lead screw cooperating with said lead screw nut and adapted to move said arm longitudinally within said tube.

26. In a machine for propelling a tool such as a blowpipe, the combination of a channel having substantially parallel sides and a base, the edges of said sides constituting rails; plates secured to and closing the ends of said channel; a cover closing the open side of said channel; a carriage engaging and movable along said rails; means secured to said carriage for supporting a tool or blowpipe; a drive shaft extending lengthwise through said channel and through said plates; and mechanism whereby said carriage may be propelled along said rails by said drive shaft.

27. A machine according to claim 26, in which said channel, said plates, and said cover constitute a dust-excluding housing for said mechanism, in combination with means for controlling said mechanism comprising a manually operable device disposed outside said housing.

28. In a machine for propelling a tool such as a blowpipe, the combination of a channel having parallel sides and a base, the top edges of said sides constituting rails; a tool carriage supported upon and movable along said rails; a drive shaft extending lengthwise of said channel between said sides; a rack secured to said base within said channel and parallel to said shaft; and mechanism cooperating with said carriage, said shaft, and said rack to propel said carriage along said rails.

29. In a machine for propelling a tool such as a blowpipe, the combination of a channel having parallel sides and a base, the top edges of said sides constituting rails; legs at the ends of said channel supporting the latter in an elevated position; a carriage supported upon and movable along said rails; a support secured to said carriage and extending across and beneath said channel; a tool holder mounted adjacent one end of said support and opposite one side of said machine; an adjusting handle mounted adjacent the other end of said support and opposite the other side of said machine; and adjustable means carried by said support and operatively connecting said handle and said holder.

HOMER W. JONES.
JAMES H. BUCKNAM.
HERBERT W. COWIN.

CERTIFICATE OF CORRECTION.

Patent No. 2,054,425.  September 15, 1936.

HOMER W. JONES, ET AL.

It is hereby certified that error appears in the printed specification of the above numbered patent requiring correction as follows: Page 5, first column, line 12, claim 1, after the word "carriage" first occurrence, insert a semi-colon; lines 72-73, claim 7, strike out "constituting a pair of track rails" and insert the same after "sides" and before the comma in line 71, same claim; and that the said Letters Patent should be read with these corrections therein that the same may conform to the record of the case in the Patent Office.

Signed and sealed this 1st day of December, A. D. 1936.

(Seal)

Henry Van Arsdale
Acting Commissioner of Patents.